(12) United States Patent
Hong

(10) Patent No.: US 7,242,970 B2
(45) Date of Patent: Jul. 10, 2007

(54) BLUETOOTH™ HANDS-FREE KIT STRUCTURE

(76) Inventor: Chu-Chai Hong, 5F, No. 102, MinChuan Rd., HsinTien, Taipei (TW)

(*) Notice: Subject to any disclaimer, the term of this patent is extended or adjusted under 35 U.S.C. 154(b) by 594 days.

(21) Appl. No.: 10/628,272

(22) Filed: Jul. 29, 2003

(65) Prior Publication Data

US 2004/0162026 A1    Aug. 19, 2004

(30) Foreign Application Priority Data

Feb. 14, 2003 (TW) ............... 92202358 U

(51) Int. Cl.
*H04M 1/00* (2006.01)

(52) U.S. Cl. ............... 455/569.1; 455/569.2; 455/573; 455/575.1; 455/575.2; 455/41.2; 455/90.3; 455/344; 455/345; 379/420.01; 379/420.02; 379/420.04; 379/428.01; 379/428.02; 379/449

(58) Field of Classification Search ........... 455/41.1–3, 455/569.1–2, 570–573, 90.1–3, 344–350, 455/575.1–2; 379/420.01–2, 420.04, 428.01–2, 379/446, 449
See application file for complete search history.

(56) References Cited

U.S. PATENT DOCUMENTS 5,754,962 A * 5/1998 Griffin ............... 455/569.2
5,898,908 A * 4/1999 Griffin et al. ............ 455/127.2
6,029,072 A * 2/2000 Barber ................ 455/557
6,526,294 B1 * 2/2003 Banh et al. ............ 455/573
6,731,761 B1 * 5/2004 Zablocki et al. .......... 381/86
6,788,528 B2 * 9/2004 Enners et al. ............ 361/683
6,978,163 B2 * 12/2005 Dyer et al. ............ 455/575.2
2002/0002035 A1 * 1/2002 Sim et al. ............ 455/41
2005/0085276 A1 * 4/2005 Yamaguchi et al. ...... 455/569.1

* cited by examiner

*Primary Examiner*—Matthew D. Anderson
*Assistant Examiner*—Tuan Tran
(74) *Attorney, Agent, or Firm*—Troxell Law Office, PLLC

(57) ABSTRACT

The present invention is a Bluetooth™ hands-free kit structure. After the hands-free module according to the present invention executes Bluetooth™ functional pairing with a Bluetooth™-equipped mobile phone, it can be used as a acoustic type hands-free muting system device of Bluetooth™-equipped mobile phone which employs acoustic speakers as its audio output, or can be used as a Bluetooth™-equipped hands-free kit which employs a loudspeaker as its audio output, and also can be used as a Bluetooth™ earphone by itself. The Bluetooth™ hands-free kit structure can be expanded to have both charging and Bluetooth™-functions, and also can be a module structure with private communication switch capability.

19 Claims, 3 Drawing Sheets

BLUETOOTH™ HANDS-FREE KIT STRUCTURE

BACKGROUND OF THE INVENTION

1) Field of the Invention

The invention is related to a Bluetooth™ hands-free kit structure, especially to a complete apparatus which utilizes a Bluetooth™ module constructed on Bluetooth™ earphone and an stand composed of an associated built-in circuit to connect an integration of audio output device (the device can be a acoustic type hands-free muting system device of mobile phone or loudspeaker), so that the apparatus is equipped with both charging and Bluetooth™ hands-free kit functions (while connecting with a acoustic type hands-free muting system device of mobile phone, it is a acoustic type muting hands-free kit of mobile phone; while connecting with a loudspeaker, it is a Bluetooth™ hands-free kit, which employs automotive power supply when used on a car; and also can be used indoors by way of converting indoor AC power to DC power using a power converter). Hence, there is no need to construct Bluetooth™ modules in the interior of the stand and the acoustic type hands-free muting system device of mobile phone or loudspeaker, and the objectives of cost saving and multiple usages can be achieved.

2) Description of the Prior Arts

Accompanying the improvement of automotive production technique, automobile is no longer a product of unreachable high price, but rather an everyday transportation means. In addition to the present day that radio communication is prevalent, almost everyone will purchase a mobile phone for the convenience of communicating with relatives and friends. But driving while talking on mobile phone is a very dangerous behavior that may distract the driver and cause traffic accident. Hence, most traffic safety code in the world had prohibited drivers from using a handheld mobile phone to proceed with a conversation while driving, but rather place mobile phone on automobile and apply wired hands-free headset to connect with the mobile phone to proceed with communication. But owing to the confinement of the wired earpiece, drivers still is distracted.

Along with the progress of technology, a wireless automotive hands-free headset had been developed. Due to especially the mature of Bluetooth™ technique and the stability of receiving and transmitting radio signals using Bluetooth™ technology, every leading mobile phone manufacturer is consecutively publishing new Bluetooth™ enabled mobile phones to the market. Thus, based on the increase of demand, the p rice of Bluetooth™ chip is lower to an extent that even an ordinary consumer can accept. Accordingly, products of automotive hands-free headset could multiply in the near future and flood the market. Nevertheless, as to an ordinary Bluetooth™ automotive hands-free kit, it does not integrate with Bluetooth™ earphone. Therefore, while user requiring private communication, one must use an ordinary private communication device. Considering that a communication is in progress while user is getting off car, an ordinary Bluetooth™ automotive hands-free kit will need to finish the communication first, and then execute Bluetooth™ functional pairing with Bluetooth™ earphone once again in order to be able to apply the Bluetooth™ earphone to continue with the communication, which is very inconvenient.

Therefore, one of the characteristic of the present invention is having functions of Bluetooth™ earphone, automotive hands-free kit, private communication at the same time, along with providing a continuing communication through Bluetooth™ earphone after user had gotten off car. Moreover, the prior arts need to apply two sets of Bluetooth™ chips on each Bluetooth™ earphone and automotive hands-free kit at the same time to achieve the objective that audio system of automobile and Bluetooth™ earphone can operate simultaneously; the nature of the present invention is to integrate Bluetooth™ earphone, stand, acoustic type hands-free muting system device of mobile phone or loudspeaker, so as to proceed with communication using mobile phone, and when a private communication is needed, one only need to pick up Bluetooth™ earphone and wear it on ones ear, then the communication can continue without worrying the others might hear the conversation. When need to get off car immediately during a conversation, simply to pick up Bluetooth™ earphone and wear it on ones ear and carry the Bluetooth™ enabled mobile phone, the conversation could continue using the Bluetooth™ earphone. But just because of that, without the present invention, users will need to purchase nowadays still expensive Bluetooth™ hands-free car kit and Bluetooth™ earphone to achieve the above functions. And Bluetooth™ mobile phone that has already paired with Bluetooth™ hands-free car kit will need to execute Bluetooth™ functional pairing with Bluetooth™ hands-free car kit, so as to use the Bluetooth™ earphone. For the users' sake, not only can not have complete functions of the present invention, but also a tremendous cost burden. Therefore, the objective of the present invention is to come up with a brand-new structure that can reduce the cost of the above apparatus, so as to provide a more convenient, more efficient, and much more usages to enable more consumers' liking of using the apparatus.

SUMMARY OF THE INVENTION

Based on solving the above-mentioned drawbacks of the prior arts, the present invention is a Bluetooth™ hands-free kit structure whose main objective is to construct Bluetooth™ module on Bluetooth™ earphone, that enables the earphone not only can act along as a Bluetooth™ earphone, but also act as a complete Bluetooth™ hands-free kit device through the integration of power input and output port, audio input and output port of the Bluetooth™ earphone, and an otherwise constructed stand containing voltage regulation circuit, DC power conversion circuit, audio output amplification circuit, etc. which can be expanded to be a hands-free kit, along with a DC power input port for DC power input and a signal output port for connection of acoustic type muting system device of mobile phone or loudspeaker. Within the acoustic type muting system device of mobile phone, there is a detection circuit for detecting muting signals or speech signals, and a set of or one audio output circuit device to switch audio output between audio system and mobile phone; and a DC power input port is provided for DC power input, a signal output port is provided for the connection of several loudspeakers; a DC power output port that connects with voltage regulation circuit is provided for DC power input. Thus, there is no need to construct Bluetooth™ module inside stand and acoustic type muting system device of mobile phone or loudspeaker. When placing a Bluetooth™ earphone on stand, the Bluetooth™ earphone can be charged and communicate with acoustic type muting system device of mobile phone or loudspeaker through an associated built-in circuit of the stand. A complete multi-functional Bluetooth™ hands-free kit is a Bluetooth™ earphone with internal Bluetooth™ module works in cooperation with a stand with associated built-in circuit and acoustic type muting system device of mobile phone or loudspeaker.

With this structure, there is no need to construct Bluetooth™ modules on both Bluetooth™ earphone and automotive hands-free mobile phone system as the prior arts did. Therefore, the present invention not only can save cost but also can provide users the same functions that the prior arts can provide with a lower cost.

For your esteemed members of reviewing committee to further understand and recognize the objectives, the characteristics, and the functions of the invention, a detailed description in matching with corresponding drawings are presented as the following.

DETAILED DESCRIPTION OF THE INVENTION

Figure 1:
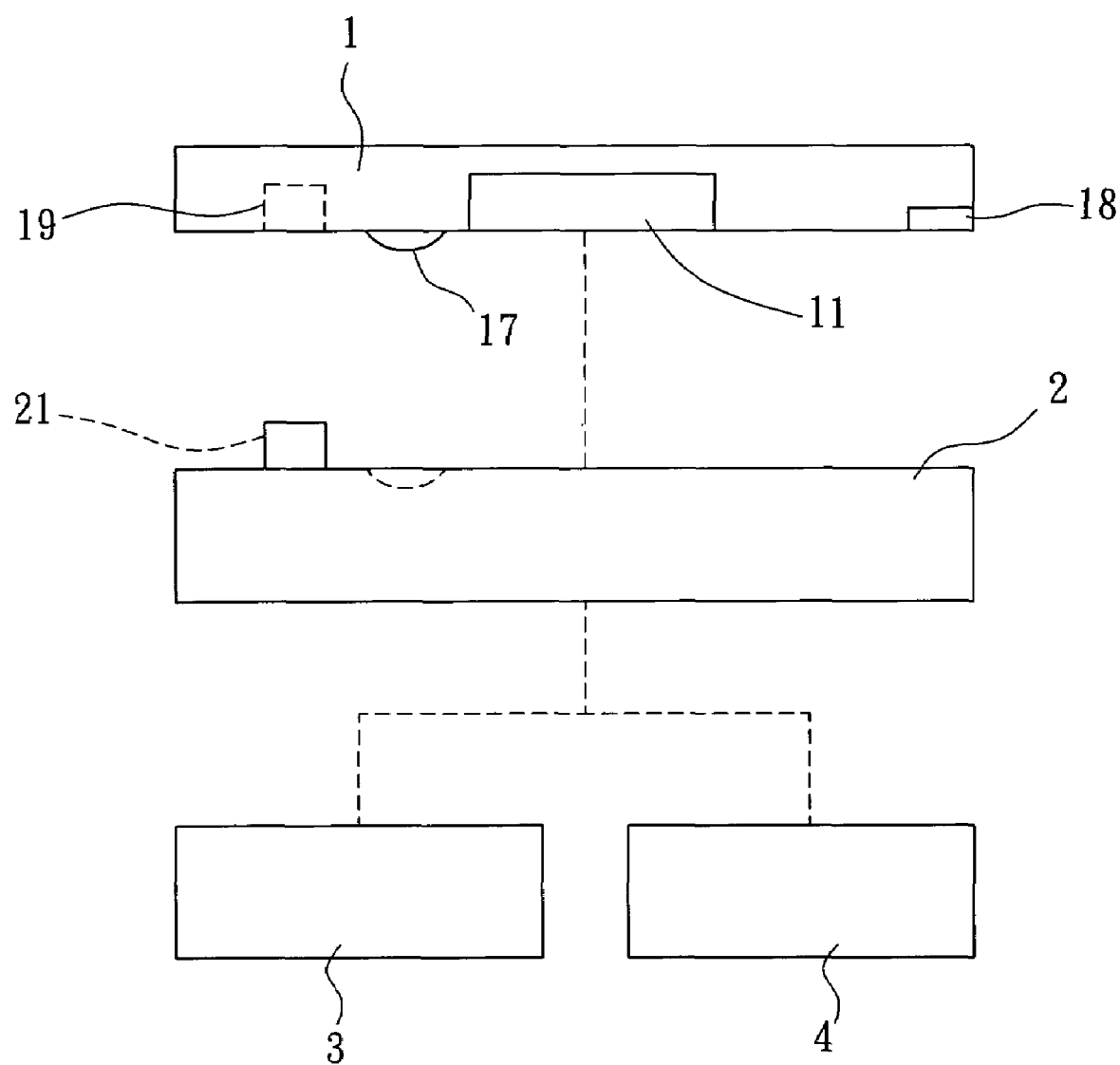
FIG. 1 is a function b lock structure schematic diagram in accordance with the prior arts.
Figure 2:
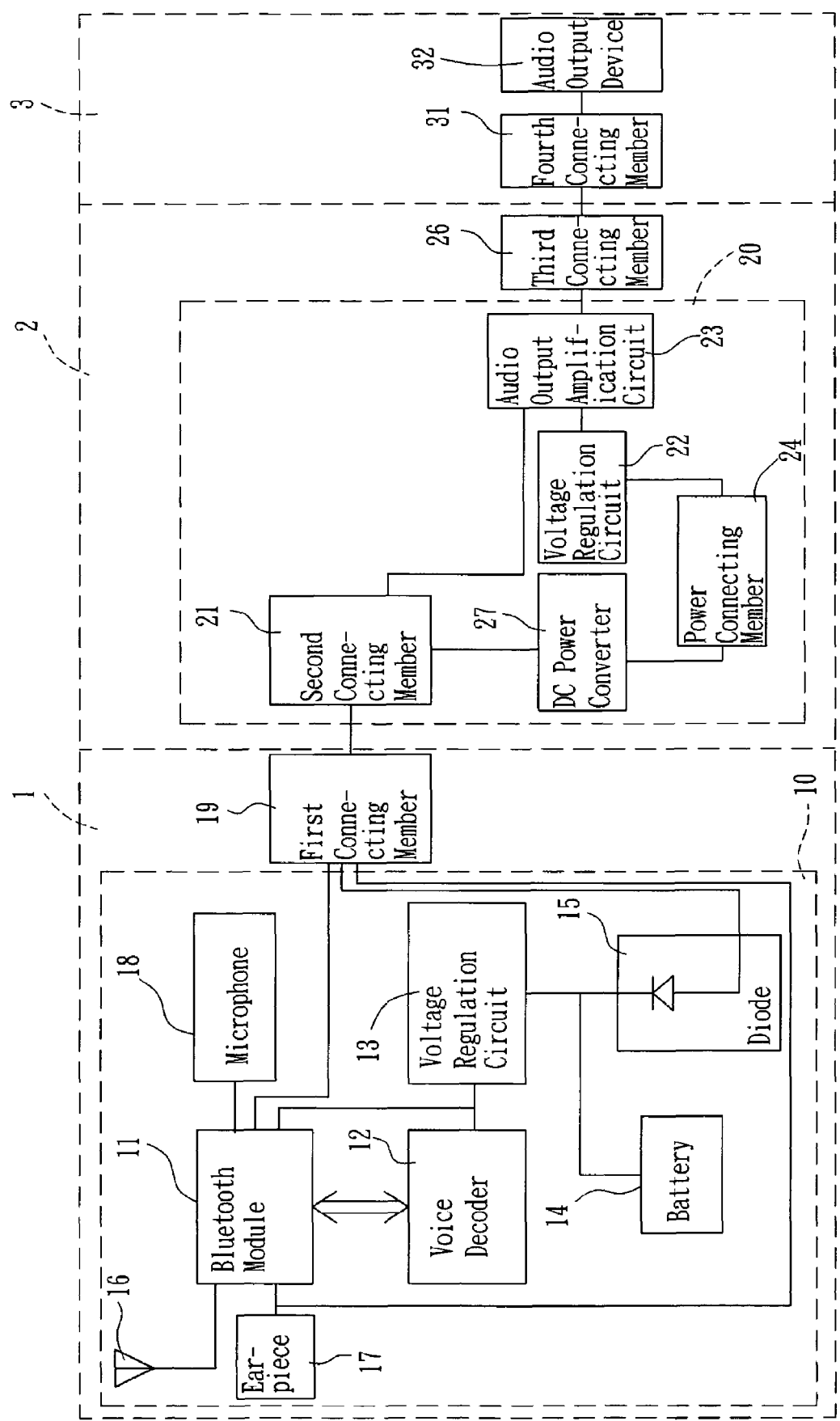
FIG. 2 is a detailed function block diagram depicting a Bluetooth™ earphone together with an integration of audio output device and a stand (includes loudspeaker and acoustic type hands-free muting system device of mobile phone)

Please refer to FIG. 1 and FIG. 2, a Bluetooth™ module 11 is constructed on Bluetooth™ earphone 1, and further a stand 2 is employed to connect an integration 3 of audio output device (which can be a acoustic type muting system device of mobile phone or a loudspeaker); whereas there is no need to construct Bluetooth™ module in the interior of the stand 2 and the integration 3 of audio output device. When Bluetooth™ earphone 1 is placed on stand 2, first connecting member 19 of Bluetooth™ earphone 1 connects with stand 2 to provide DC power for Bluetooth™ earphone 1 and charge an accumulator of Bluetooth™ earphone 1. One end of first connecting member 19 is connected with diode protection circuit 15, Bluetooth™ module 11, and earphone circuit; the other end of first connecting member 19 is connected to second connecting member 21, where first connecting member 19 can be a socket and second connecting member 21 can be a plug.

To ensure elimination of echoes, audio signals of Bluetooth™ earphone 1 are transmitted through audio output amplification circuit 23 which thereof connects with echo cancellation circuit 25 to form an electrical connection with Bluetooth™ module 11 through second connecting member 21 and first connecting member 19. Power connecting member 24 is used to connect external DC power supply. While indoors, a power converter can convert AC 100V~240V to DC power and thereof inputs to the power connecting member 24 which can be a socket; while inside a car, a DC power supply of automobile can be used (e.g. cigarette lighter). One end of power connecting member 24 is connected to DC power converter 27 which thereof connects with second connecting member 21, and then is connected to first connecting member 19, so as to provide power to Bluetooth™ earphone 1 and charge battery 14 inside Bluetooth™ earphone 1. The other end of power connecting member 24 is connected to voltage regulation circuit 22 which thereof connects with audio output amplification circuit 23, so that appropriate DC power is provided thereof; audio output amplification circuit 23 connects with echo cancellation circuit 25 to form an electrical connection with Bluetooth™ earphone through second connecting member 21 to ensure elimination of echoes.

A third connecting member 26 connects with audio output amplification circuit 23 which thereof through fourth connecting member and audio output device to output audio. Third connecting member 26 can be either a socket or a radio transmitter.

Fourth connecting member 31 which can be either a plug or a radio receiver connects with third connecting member 26 and audio output device 32. After all the members are connected, a Bluetooth™ functional pairing can be executed to a corresponding Bluetooth™ chip constructed on mobile phone so as to proceed with radio signal transmission.

Moreover, A Bluetooth™ module 11 is constructed inside the Bluetooth™ earphone 1 that can convert voice signals to radio signals for the purpose of transmission. The Bluetooth™ module 11 is further connected to voice decoder 12 that is responsible for vocal data encoding/decoding. To help radio transmission, the encoding/decoding method employed by voice decoder 12 uses PCM CODEC mode as coder and decoder. Furthermore, an antenna 16, a earpiece 17, and a microphone 18 is connected to Bluetooth™ module 11, so that enables Bluetooth™ earphone 1 to have abilities of voice receiving and transmitting. Also, a battery 14 is set up inside Bluetooth™ earphone. Battery 14 is connected to a diode protection circuit 15 and using voltage regulation circuit 13 to regulate a stable voltage (e.g. 3.3 V in this embodiment) which connects with Bluetooth™ module 11 and voice decoder 12 simultaneously, so as to provide power to the whole Bluetooth™ earphone 1. Bluetooth™ earphone 1 of the present invention can use not only power from battery 14, but a DC voltage through first connecting member 19 from external can be its power supply. The external voltage further can be used to charge battery 14 through diode 15.

Figure 3:
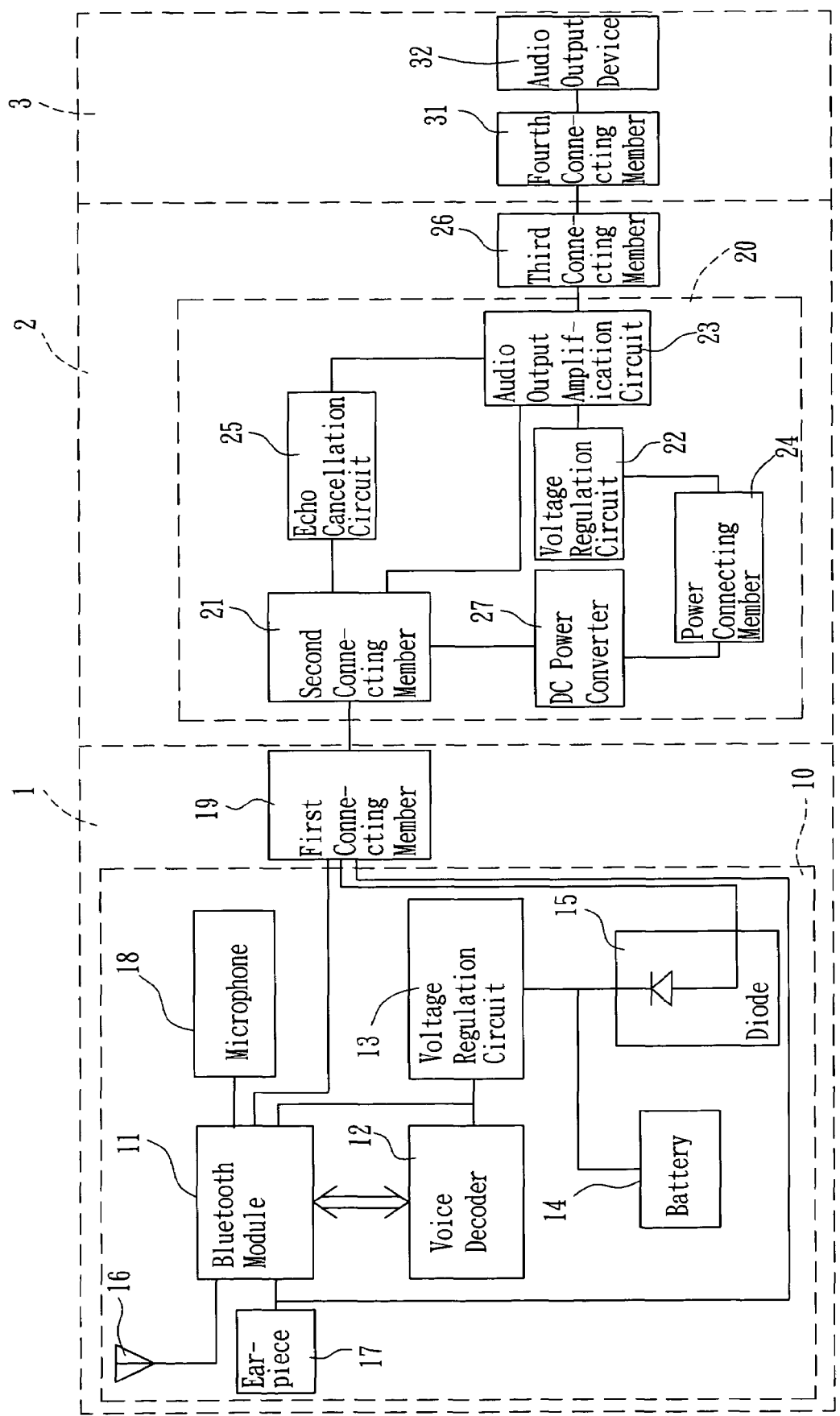
FIG. 3 is another preferred detailed function block diagram depicting a Bluetooth™ earphone together with an integration of audio output device and a stand (includes loudspeaker and acoustic type hands-free muting system device of mobile phone)

Please refer to FIG. 3, a detailed function block diagram is illustrated depicting a Bluetooth™ earphone together with an integration of audio output device that is inside a stand, comprising Bluetooth™ earphone 1, stand 2 and integration of audio output device 3, wherein the stand 2 includes a power connecting member 24 which is used to connect external power supply. While indoors, a power converter can convert AC 100V~240V to DC power and inputs thereof to power connecting member 24; while inside a car, a DC power supply of automobile can be used (e.g. cigarette lighter). The other end of power connecting member 24 is connected to a voltage regulation circuit 22, DV power converter, etc., where the voltage regulation circuit 22 can stabilize voltage so as to regulate an inputted DC working voltage to an appropriate stable voltage. The power connecting member, through a DC power converter 27 (DC to DC converter) to transform voltage to a voltage appropriate for battery charging, provides necessary power to Bluetooth™ earphone 1 that can charge battery 14 inside the Bluetooth™ earphone 1 of FIG. 2 through diode 15. Another end of voltage regulation circuit 22 is connected to audio output amplification circuit 23 to provide audio output amplification circuit 23 a stable voltage.

An acoustic type hands-free muting system device of mobile phone is a hands-free incoming call automatic muting device of mobile phone, which by operating in cooperation with amplifier and loudspeaker can prevent signals of amplifier from outputted to loudspeakers, and instead output receiving signals generated by mobile phone to the loudspeakers. And when mobile phone finishes communicating, signals of amplifier are reinstated and output to the loudspeakers. In this way, it is applicable to mobile phones and can avoid mistaken mobile phone actions. Hence, while operating in combination with automotive acoustic system can achieve the objective of safe driving.

Moreover, the present invention can combine with many different modules to act as Bluetooth™ hands-free kit of different usages and functions. While using in cars, it is an automotive Bluetooth™ hands-free kit that employs automotive power supply as its power supply. While using indoors, it is an indoor Bluetooth™ hands-free kit which utilizes a power converter to convert AC 100V~240V to DC as its power supply. The converter not only has a charging function as Bluetooth™ charger, but also has functions of indoor Bluetooth™ hands-free kit. Respectively described as following:

Different indoor embodiments according to different modules connected:

1. While combining with acoustic system, it is a acoustic type hands-free muting system device of mobile phone; if the embodiment is placed on desktop, then it is a acoustic type muting desktop hands-free kit of mobile phone; while installing, first chose a location where stand is stationed (e.g. kitchen, workroom) which in principle shall not obstruct working and shall be at an appropriate distance from user's mouth, then associated apparatuses, e.g. acoustic type hands-free muting system device of mobile phone, acoustic amplifier, acoustic speakers, power supply, etc. are connected, finally, Bluetooth™ earphone is places on the stand. If the combined module is used on desktop, it is an acoustic type desktop hands-free kit of mobile phone; if the combined module is used indoors, it is an indoor acoustic type hands-free kit of mobile phone. While private communication is needed, simply pick Bluetooth™ earphone which is placed on stand and wear it on user's ear, the connection between the Bluetooth™ earphone and the stand is severed that enable voice to output only from the Bluetooth™ earphone. Therefore, the voice from incoming call of mobile phone will not be outputted from acoustic speakers and the privacy of conversation is achieved. In this way, it becomes a multi-functional acoustic type muting indoor or desktop hands-free kit of mobile phone (depends on where it is used) equipped with functions such as charging, Bluetooth™ hands-free, private communication, and instant acoustic system muting while conversation, etc. Acoustic speakers shall be places at appropriate locations which not obstructing work but still can be heard. While leaving, all one needs to do is pick up the Bluetooth™ earphone and mobile phone that is already Bluetooth™ paired with Bluetooth™ earphone and the communication can continue without interruption.

2. While connecting directly with loudspeaker, it is a indoor-specialized Bluetooth™ hands-free kit; if the embodiment is placed on desktop, then it is a desktop Bluetooth™ hands-free kit; while installing, first chose a location where stand is stationed (e.g. kitchen, workroom) which in principle shall not obstruct working and shall be at an appropriate distance from user's mouth, then connects loudspeaker and power supply, finally, Bluetooth™ earphone is places on the stand. In this way, it becomes a multi-functional indoor-specialized or desktop Bluetooth™ hands-free kit (depends on where it is used) equipped with functions such as charging, Bluetooth™ hands-free, private communication, etc. Loudspeaker shall be places at appropriate locations which not obstructing work but still can be heard. While private communication is needed, simply pick Bluetooth™ earphone which is placed on stand and wear it on user's ear, the connection between the Bluetooth™ earphone and the stand is severed that enable voice to output only from the Bluetooth™ earphone. At the same time, the loudspeaker connected with the stand is interrupted from receiving signals caused by the separation of the Bluetooth™ earphone and the stand, therefore, the voice from incoming call of mobile phone will not be outputted from loudspeaker connected with stand and the privacy of conversation is achieved. While leaving, all one needs to do is pick up mobile phone that is already Bluetooth™ paired with Bluetooth™ earphone and the communication can continue without interruption.

Automotive embodiments are illustrated as following:

1. While combining with automotive acoustic system, it is an automotive acoustic type muting hands-free kit of mobile phone; While installing, first chose a location where stand is stationed shall be at an appropriate distance from driver's mouth, then the associated apparatuses, e.g. automotive acoustic type hands-free muting system device of mobile phone, acoustic amplifier, acoustic speakers, power supply, etc. are connected, finally, Bluetooth™ earphone is places in the stand. While private communication is needed, simply pick Bluetooth™ earphone which is placed on stand and wear it on user's ear, the connection between the Bluetooth™ earphone and the stand is severed that enable voice to output only from the Bluetooth™ earphone. therefore, the voice from incoming call of mobile phone will not be outputted from acoustic speakers and the privacy of conversation is achieved. In this way, it becomes a multi-functional automotive acoustic type muting hands-free kit of mobile phone equipped with functions such as charging, Bluetooth™ hands-free, private communication, and instant acoustic system muting while conversation, etc. While getting off car, all one needs to do is pick up the Bluetooth™ earphone and mobile phone that is already Bluetooth™ paired with Bluetooth™ earphone and the communication can continue without interruption.

2. While connecting directly with loudspeaker, it is a specialized automotive Bluetooth™ hands-free kit. While installing, first chose a location where stand is stationed shall be at an appropriate distance from driver's mouth, then connects loudspeaker and power supply, finally, Bluetooth™ earphone is places in the stand. While private communication is needed, simply pick Bluetooth™ earphone which is placed on stand and wear it on user's ear, the connection between the Bluetooth™ earphone and the stand is severed that enable voice to output only from the Bluetooth™ earphone. At the same time, the loudspeaker connected with the stand is interrupted from receiving signals caused by the separation of the Bluetooth™ earphone and the stand, therefore, the voice from incoming call of mobile phone will not be outputted from loudspeaker connected with stand and the privacy of conversation is achieved. In this way, it becomes a multi-functional automotive Bluetooth™ hands-free kit equipped with functions such as charging, Bluetooth™ hands-free, private communication, etc. While getting off car, all one needs to do is pick up the Bluetooth™ earphone and mobile phone that is already Bluetooth™ paired with Bluetooth™ earphone and the communication can continue without interruption.

Summarize the above techniques illustrated in FIG. 1 to FIG. 3. It is clear that the present invention, different from the prior arts, does not need to construct Bluetooth™ modules both in Bluetooth™ earphone and in hands-free kit simultaneously, so that the cost can be saved and users can acquire a device of the same functions as the prior arts with lower price. Need not to mention the convenience in usage, because the present invention can make a Bluetooth™ earphone becomes not only a Bluetooth™ earphone but all kinds of Bluetooth™ hands-free headset according to the expanding usage of the present invention (e.g. automotive Bluetooth™ hands-free kit, automotive acoustic type muting hands-free kit of mobile phone, desktop Bluetooth™ hands-free kit, desktop acoustic type hands-free kit of mobile phone, indoor Bluetooth™ hands-free kit, indoor acoustic type muting hands-free kit of mobile phone, etc.), and Bluetooth™ earphone used does not need to engage pairing or disengage pairing repeatedly with all kinds of Bluetooth™ hands-free kit used interchangeably. The modem Bluetooth™ earphone can be used only as an earpiece. When a user enters a car and need to use all kinds of automotive Bluetooth™ hands-free kit, or returns home and need to use all kinds or indoors or desktop Bluetooth™ hands-free kit, the user has to disengage Bluetooth™ pairing between mobile phone and Bluetooth™ earphone, then engage Bluetooth™ pairing with all kinds of Bluetooth™ hands-free kit (e.g. automotive Bluetooth™ hands-free kit, automotive acoustic type muting hands-free kit of mobile phone, desktop Bluetooth™ hands-free kit, desktop acoustic type hands-free kit of mobile phone, indoor Bluetooth™ hands-free kit, indoor acoustic type muting hands-free kit of mobile phone, etc.) before it can be used. Therefore, the present invention solves the inconvenience of interchanging usage of every Bluetooth™ hands-free headsets. Consequently, the present invention has been examined to be progressive and has great potential in commercial applications.

Those skilled in the art should appreciate that they can readily use the disclosed conception and specific embodiments as a basis for designing or modifying other structures for carrying out the same purpose of the present invention, and that various changes, substitutions and alterations can be made herein without departing from the spirit and scope of the invention as defined by the append claims.

What is claimed is:

1. A Bluetooth™ hands-free kit structure, comprising:
    a Bluetooth™ earphone, whose interior circuit includes a Bluetooth™ module, a voice decode, a voltage regulation circuit, a battery, an antenna, an earpiece, a first connecting member and a microphone, which can proceed with radio signal transmission to a corresponding Bluetooth™ chip constructed on mobile phone;
    a stand, whose interior circuit includes a second connecting member, a third connecting member, a power connecting member, a voltage regulation circuit, a DC convert circuit, a audio output amplification circuit, wherein said stand and said Bluetooth™ earphone form an electrical connection through said first connecting member and said second connecting member to enable signals mutually receivable or to provide power and charging while transmitting; and
    an integration of audio output apparatus, which is connected to a connecting member corresponding to said stand either through a wired interface or a radio interface, wherein said integration of audio output apparatus includes a fourth connecting member and audio output device, wherein said fourth connecting member connects with said audio output device and said third connecting member, so that vocal signals of said stand can be regulated and magnified by way of said audio output device,
    wherein the structure is configured to be capable of seamlessly transferring the vocal signals during a phone call from being outputted by the audio output to being outputted by the Bluetooth™ earphone, the transfer being triggered by the removal of the earphone from the stand.

2. The Bluetooth™ hands-free kit structure as recited in claim 1, wherein only one in the group comprising said Bluetooth™ earphone and said stand includes an echo cancellation circuit.

3. The Bluetooth™ hands-free kit structure as recited in claim 1, wherein said third connecting member is a socket.

4. The Bluetooth™ hands-free kit structure as recited in claim 1, wherein said third connecting member is a radio transmitter.

5. The Bluetooth™ hands-free kit structure as recited in claim 1, wherein said fourth connecting member is a plug.

6. The Bluetooth™ hands-free kit structure as recited in claim 1, wherein said fourth connecting member is a radio receiver.

7. The Bluetooth™ hands-free kit structure as recited in claim 1, wherein said battery is in tandem with a diode protection circuit.

8. The Bluetooth™ hands-free kit structure as recited in claim 1, wherein the interior of said stand includes a charging circuit that can charge said internal battery of said Bluetooth™ earphone.

9. The Bluetooth™ hands-free kit structure as recited in claim 1, wherein said audio output device is a loudspeaker.

10. The Bluetooth™ hands-free kit structure as recited in claim 1, wherein said audio output device is acoustic type muting control system apparatus.

11. The Bluetooth™ hands-free kit structure as recited in claim 1, wherein said audio output amplification circuit of said stand comprises a volume regulation circuit.

12. The Bluetooth™ hands-free kit structure as recited in claim 1, wherein said power connecting member is a socket.

13. The Bluetooth™ hands-free kit structure as recited in claim 1, wherein said power connecting member is a contact terminal.

14. The Bluetooth™ hands-free kit structure as recited in claim 1, wherein said first connecting member is a socket.

15. The Bluetooth™ hands-free kit structure as recited in claim 1, wherein said first connecting member is a contact terminal.

16. The Bluetooth™ hands-free kit structure as recited in claim 1, wherein said second connecting member is a plug.

17. The Bluetooth™ hands-free kit structure as recited in claim 1, wherein said second connecting member is a contact terminal.

18. The Bluetooth™ hands-free kit structure as recited in claim 1, wherein the structure includes only one Bluetooth™ module.

19. The Bluetooth™ hands-free kit structure as recited in claim 1, wherein the structure is configured to be capable of seamlessly transferring the vocal signals during a phone call from being outputted by the Bluetooth™ earphone to being outputted by the audio output, the transfer being triggered by docking the earphone with the stand.

* * * * *